Sept. 22, 1959 L. A. NICOLAI ET AL 2,905,630
AUTOMATIC CONTROL OF HYDROFORMING AND RELATED OPERATIONS
Filed Nov. 23, 1955
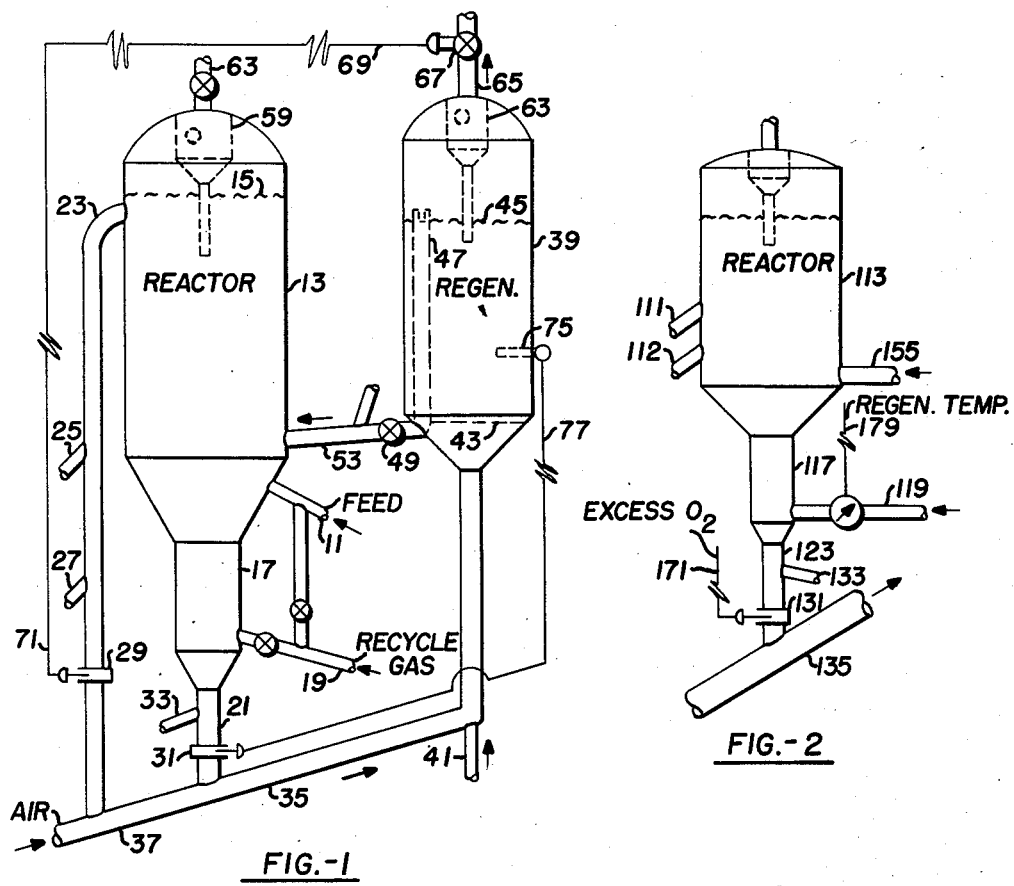
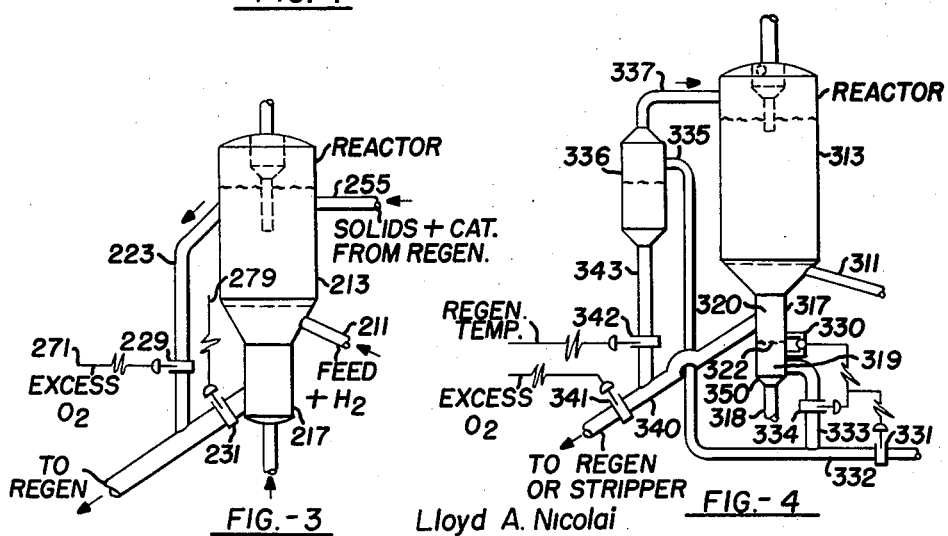
Lloyd A. Nicolai
Charles W. Tyson    Inventors
Edward J. Gornowski
By Small, Dunham & Thomas Attorneys United States Patent Office 2,905,630
Patented Sept. 22, 1959

2,905,630

AUTOMATIC CONTROL OF HYDROFORMING AND RELATED OPERATIONS

Lloyd Arthur Nicolai, Baton Rouge, La., and Charles W. Tyson, Summit, and Edward J. Gornowski, Cranford, N.J., assignors to Esso Research and Engineering Company, a corporation of Delaware Application November 23, 1955, Serial No. 548,690

1 Claim. (Cl. 208—134)

The present invention relates to improvements in automatic control of hydroforming and related operations and other processes wherein organic materials to be converted or changed chemically are contacted with finely divided solid particles. The invention has particular application to the catalytic conversion or reforming of hydrocarbon fractions in the presence of hydrogen, but in its broader aspects is not limited thereto.

In the prior art numerous proposals have been made for the catalytic reforming or "hydroforming" of petroleum fractions, especially of the naphtha boiling range. The purpose of such reforming is ordinarily to improve the octane rating of the naphtha and thus produce a more satisfactory motor fuel. It will be understood, however, that the invention is applicable to the reforming or conversion of other hydrocarbon fractions, e.g. in the presence of hydrogen and with aid of catalysts, and of non-hydrocarbon materials which can be subjected to comparable treating conditions.

The catalytic reforming of naphtha is a highly endothermic reaction requiring a substantial input of heat to the process. In the past, various means have been proposed for supplying the required heat. One of the most satisfactory methods is by the use of finely divided solid particles which are preheated, and therefore help supply heat for conversion, and which serve also as catalyst for the reaction. Ordinarily, however, it is not possible to supply all of the required heat by preheating the catalyst, and supplementary heat is often supplied by preheating the feed, by heating the recycle or other hydrogen-containing gases, and even by the use of heat exchanger surfaces within the reaction zone. It has also been proposed in the prior art to supply at least part of the heat by circulating fluidizable, but essentialy non-catalytic solids, with or into the catalyst in the reactor. Such non-catalytic solids have the advantage of being able to carry the necessary heat without changing the catalytic characteristics of the reaction zone. They make it possible to control catalyst to oil ratio, thereby controlling conversion, coke deposition on catalyst, etc. Materials such as metal shot, coarse mullite particles and the like, have been proposed for this purpose. Such material, known collectively as "shot," is contemplated as an important feature of the present invention.

The activity of a bed of catalytic particles depends upon several factors, such as temperature, space velocity of the material to be reacted, reaction time, and the presence of other materials. In many cases, and certainly in naphtha reforming, the reaction also depends, as suggested above, upon the maintenance of temperature during a highly endothermic reaction. By adjusting the proportions of catalyst and non-catalytic solids, the heat balance may be adjusted as required. An important object of the present invention is the automatic maintenance of a thermal balance within the reaction zone.

According to the present invention, a mobile mass, such as a fluidized bed of finely divided solid catalytic material, is contacted with the feed to be converted. In addition to the catalyst, non-catalytic solids or shot are supplied to the reaction zone to maintain the thermal balance. In the process of conversion of hydrocarbons such as naphtha, there is always some degradation of certain portions of the feed. This results in the production of coke on the catalyst particles. In order to maintain catalyst activity this coke must be removed in some manner; usually it is burned off. If pure catalyst is used and substantial deposits of coke are formed, regeneration temperatures may become excessively high in the process of burning off the coke. Excessively high temperatures damage the catalyst and render it relatively useless. By circulating suitable proportions of non-catalytic solids with the catalyst and by withdrawing catalyst and non-catalytic solids together or separately at individually controlled rates, any desired ratio of catalyst to feed or of catalyst to non-catalyst in the reactor may be obtained.

Hence, according to the present invention, the relative proportions of catalyst to feed and/or of catalytic solids to non-catalyst are adjusted automatically. This is done in accordance with variables which are automatically determined extraneously, preferably in the regeneration of the catalyst, where an oxygen-containing gas such as air or diluted air is used to burn off the carbon. If an excess of oxygen is used beyond that required to consume the coke or carbon on the catalyst, this excess can be measured in the flue gases from the regenerator by suitable instruments of known type. By appropriate controls forming no part per se of the present invention, the excess oxygen can be used, through suitable instruments, for controlling the recycle of catalyst from the reactor to the regenerator. With more oxygen available more carbon can be burned off the catalyst.

Under some conditions the single control just described might permit runaway temperatures with serious injury to the catalyst if it were not kept in balance. According to the present invention, the required balance is obtained and maintained by measuring the temperature within the regenerating zone. This temperature measurement is utilized, through suitable instruments, which also form no part of the present invention per se, to regulate other factors so as to offset the tendency toward runaway temperatures. A specifically preferred arrangement is to use the regenerative temperature to control the flow of non-catalytic solids (or in appropriate cases the total flow of solids) between the reactor and the regenerator.

Thus, a preferred embodiment controls the rate of catalyst circulation by excess oxygen in the regenerator flue gas and controls the reactor temperatures by increasing or decreasing either the flow of shot or non-catalytic solids or the total flow of shot plus catalyst between the regenerator and the reactor in response to the regenerator temperatures.

The same general effect described above may be obtained by various modifications, as will be described in greater detail below. Thus, the feed of recycle gas (containing hydrogen) to the reactor may be controlled or divided by means of the regenerator temperature instrument to regulate the degree of separation of catalyst from non-catalytic solids. For example, by increasing the proportion of recycle gas flowing to a bottom portion or stripper section below the reactor, catalyst may be preferentially passed back into the reactor proper while the coarser shot or non-catalytic material is preferentially withdrawn. This changes the ratio of catalyst to non-catalyst in the bed and the total withdrawal rate can be controlled in response to the excess oxygen measurements in the regenerator outlet.

In still another modification, the system may be so designed as to provide for a separate inventory of shot or non-catalytic material which can be drawn on as required to establish proper temperature control and shot-to-catalyst ratio in the system. In this embodiment an increased shot-to-catalyst ratio may be obtained by increasing the flow of shot from the reservoir. The reverse effect may be obtained by increasing the withdrawal rate of catalyst from the reactor under automatic surveillance of a level controller in a separator at the bottom of the reactor.

In practicing the present invention, the following operating conditions normally apply for catalytic reforming of naphtha in the presence of hydrogen: Operating pressure 50 to 1000 p.s.i.g., usually about 200 to 500, reactor temperature 800° to 1000° F., and regenerator temperature 900° to 1200° F. The catalyst circulation rate may range preferably between 0.3 to 5.0, catalyst to oil ratio by weight. The inert solids or shot may vary between 1 and 20 times the weight of catalyst in circulation. It will be understood that these conditions may be varied.

The above variations in process and system, and others which will suggest themselves to those skilled in the art, will be more clearly understood by reference to a detailed description of the invention in its presently preferred embodiments.

Referring to the drawings,

Fig. 1 is a diagrammatic view of a reforming system with certain conventional parts omitted, showing the control of a catalyst-rich stream by the excess oxygen meter and the control of a shot-rich stream by regenerator temperature.

Fig. 2 is a fragmentary view of part of a similar system wherein the total solids return from reactor to regenerator is controlled by the excess oxygen meter, but the ratio of shot to catalyst is controlled by the regenerator temperature. In the above discussion and in that which follows the term "shot" is intended to refer generically to all solid particles of relatively low catalytic activity as compared with the catalyst itself.

Fig. 3 is a diagrammatic view in elevation of a still further embodiment, being generally similar to the reactor arrangement of Fig. 1.

Fig. 4 is a diagrammatic view of still another modification.

Referring now to Fig. 1 of the drawings, a suitable feed stock, such as a vaporized virgin naphtha or naphtha from a coker or other process, is supplied through feed inlet line 11 to reactor vessel 13, which contains a mobile or fluidized bed of solid particles 15. This bed may be comprised of a mixture of catalytic particles and non-catalytic solids and shot. The shot normally is of a greater density and/or of greater particle size than the catalyst and it tends somewhat to settle toward the bottom of the reactor. A continuous stream of solid particles, partly catalyst and partly shot, passes down from reactor 13 proper into the stripper or separating section 17. Here a stream of gas, for example, a recycle gas containing substantial proportions of hydrogen, is supplied through line 19 to fluidize the solids in separator 17 and to carry the finer particles thereof back upwardly into the reactor zone 13. Part of this hydrogen may be introduced with the feed through line 11. As a result of the action in separator 17, the solids passing downwardly through the separator from line 21 are predominantly shot, or coarse, non-catalytic material. This may be referred to as a shot-rich stream. At the same time a stream of catalyst-rich material is withdrawn from near the top of bed 15 from line 23. This line may be suitably aerated by taps 25 and 27 to keep the solids therein in a fluidized condition, as is well known in the art. The catalyst-rich stream flowing through line 23 is controlled by valve 29, and the shot-rich stream in line 21 is controlled by valve 31. Line 21 may be aerated by a suitable tap 33.

The catalyst-rich stream from line 23 and the shot-rich stream from line 21 are taken into return line 35, to which air may be supplied from inlet end 37, and are thus conveyed back into the bottom of a regenerator 39. A lift gas such as air may be supplied through tap 41 and a grid 43 may be provided in the regenerator as is known in the art. Regeneration of the catalyst takes place at a temperature preferably between about 950° and 1200° F. The level 45 in the regenerator is maintained approximately constant, the regenerated material overflowing into outlet line 47, from whence it passes through valve 49, and line 53 to return to the reactor. Suitable propulsion means may be added to line 53, such as aeration or a solids pump, if needed.

The feed, usually accompanied with some recycle gas containing hydrogen, is fed into the reactor through line 11. Together with hydrogen supplied with the catalyst gas through line 19, and separator 17, the materials are reacted in the presence of the catalyst to form the desired products. The products, in vapor form, pass upwardly through cyclone 59 and outlet line 61 to suitable recovery apparatus, not shown. Total hydrogen supplied to lines 11, 19, is commonly held constant, whereas the supply to line 19, for elutriation of fines, etc., may be varied as desired.

Likewise, in the regenerator 39, the spent gases from combustion of the carbonaceous solids on catalyst pass through a cyclone 63 and outlet line 65. A device for measuring the oxygen concentration in the flue gas is indicated at 67 and it makes this measurement at very frequent intervals, or preferably continuously, as is known in the art. Through suitable electrical connections 69 and 71 this device controls the slide valve 29 to control the rate of flow of the catalyst-rich stream.

A temperature measuring instrument 75 in the regenerator is connected, either electrically, mechanically, or pneumatically by means 77 to slide valve 31 which controls the flow of shot-rich solids through line 21, as previously mentioned.

It will readily appear to those skilled in the art that, with a given supply of air to the regenerator, an excess of oxygen in the flue gas will call for a supply of additional catalyst from line 23 to the regenerator. When this is supplied the temperature will tend to rise in the regenerator. A satisfactory ratio between catalyst and non-catalytic solids circulating between reactor and regenerator can be maintained, i.e. it is desirable to control the ratio of circulating solids. Hence, as temperature rise takes place instrument 75 will cause the valve 31 to open wider and bring in more non-catalytic solids to the burner to bring the temperature back in balance. With this arrangement, a satisfactory ratio between the catalyst and non-catalytic solids in the circulating stream can be maintained automatically during the entire operation. It will be understood that measurements of instruments 67 and 75 may be either continuous or intermittent but, if intermittent, they are sufficiently frequent to assure a substantially continuous control over the operations at all times.

An alternative method of operation is as follows: Suppose that the nature of feed to line 11 is changed so that greater carbon formation takes place on the catalyst. In this case, if the rate of flow of catalyst to the regenerator is kept constant, too much carbon will be carried to the regenerator. If desired, the shot/catalyst ratio may be kept constant and the regenerator temperature allowed to increase moderately as the additional carbon is burned. Conversely, if the carbon production decreases with a change of feed, the shot/catalyst ratio being held constant, the temperature in the regenerator will drop somewhat. So long as these variations are not excessive, and the reactor temperature can be kept substantially constant by varying preheat of feed and/or of recycle gas, stable operations can be maintained by merely adjusting controls for valve 31. The valve 31 may be disconnected from temperature control 75, 77, or a controller which does not operate until certain limits are reached may be used. By this means variations due to feed characteristics and product octane number may be handled without changing the settling conditions in reactor 13, and stripper 17. Control of feed preheat and/or of the recycle gas heating may be used to compensate for variations in coke formation from different feeds and thus keep the regenerator temperatures within allowable limits, e.g. 1050° to 1125° F., without changing reactor temperatures.

Referring now to Fig. 2, there is shown a reactor 113 to which feed (and usually some of the hydrogen) is supplied through lines 111 and 112 and to which catalyst plus inert coarse solids, e.g. shot, is supplied through line 155. Here all of the solids, catalytic and non-catalytic, are withdrawn from the reactor at its bottom. They pass down through a stripper-separator section 117 to which some recycle gas is supplied through line 119. The total recycle gas supplied to lines 111, 112 and 119 is usually kept constant. Flow in line 119 is under control of temperature in the regenerator, which is not shown in this figure. If the regenerator temperature tends to rise, the flow of gas through line 119 is increased to increase the proportion of inerts flowing down line 123. A valve 131 in line 123 is operated automatically under control of the excess oxygen meter, as indicated at 171. Hence, increase in oxygen in the regenerator flue gas (not shown in Fig. 2, but see 65, Fig. 1) calls for a larger total stream of solids to be fed to the return line 135. The ratio of shot to catalyst in this stream is controlled by temperature in the regenerator. As noted above, a part of the recycle gas may be returned to the reactor through line 111 or 112 or some may be supplied through aeration tap 133 in line 123. That part of the recycle gas which passes through line 119 is subject to fluctuation in flow by reason of the inter-control of regenerator temperature and excess oxygen. The particular control devices 171 for the standpipe slide valve and 179 for the recycle gas valve per se form no part of this invention. Reactor temperature is kept constant by the control of feed and/or recycle gas heating, to compensate for changes in coke burning.

Referring now to Fig. 3, there is shown a system that is quite similar to Fig. 1 except for certain details. Here the reactor 213 receives feed and recycle gas or hydrogen through line 211. Catalyst and shot are received from the regenerator (not shown) through line 255. A catalyst-rich stream is withdrawn through line 223 under control of slide valve 229, which in turn is controlled through means 271 from the excess oxygen meter in the regenerator flue gas. A shot-rich stream passing downwardly through 213 through the stripper or separator 217 is controlled by valve 231 through means 279 under control of the regenerator temperature.

Referring to Fig. 4, reactor 313 receives feed through line 311. A stripper section, which is also a shot-catalyst separator 317, is supplied with gas, for example, recycle gas, from the bottom through line 318. This separator 317 may contain certain elements, e.g. coarse packing, to facilitate separation of shot and catalyst. The upflowing gas velocity in separator 317 is such as to maintain an interface between a dense bed of solids, predominantly shot, at the bottom, as indicated at 319, and a more disperse phase above containing predominantly finer catalyst particles 320. The level of this interface 322 is sensed by a level controller 330 and the latter instrument, which per se is well known and forms no part of this invention, is used to control a valve 331 in a gas line 332. Shot may be withdrawn from the bed through line 333 under control of slide valve 334 which also is controlled by the level recorder 330. By the control of slide valves 331 and 334, the supply of shot or shot-rich materials through line 335 to a reservoir 336 may be controlled as desired. The gas in line 332 to 335 conveys the shot into the reservoir and then passes upwardly through line 337 into the reactor 313. Some fine solids, e.g. catalyst, may be carried along with it.

Catalyst from above the interface 322 in separator 317 passes through line 340 under control of valve 341 back to regenerator or to a stripper, if further stripping is desirable. Valve 341 is under control of regenerator excess oxygen. Valve 342 in standpipe 343 is controlled by regenerator temperature. Shot, or coarse solids, with small proportions of catalyst, flow through this line from the reservoir 336 back to the regenerator through line 340. This flow is normally continuous but its magnitude may be varied and it may be entirely cut off occasionally.

With the system just described the mixture of shot and catalyst, in desired proportions, passes out through line 340 and is controlled by the level controller 330. The shot inventory, however, is controlled by drawing more heavily or more lightly on the reservoir 336 as required by the regenerator temperature.

Thus it will be seen that the system of Figures 1 and 3, which may be considered case I, operate as follows:

From process considerations the maximum ratio of shot to catalyst which may be required may be determined and the reactor bottom section and separator (stripper) may be designed for a shot inventory corresponding to that maximum ratio. The separator may, if desired, be a separate vessel and not directly appended to the reactor, although this is commonly a preferable construction. Withdrawal lines are provided for catalyst-rich and shot-rich streams, respectively. The shot-catalyst mixture, for example, in line 35, Fig. 1, or line 135, Fig. 2, may be steam-stripped before flowing back into the regenerator, if desired, and this commonly is desirable. However, the separate streams may be stripped before blending and in this case the mixture flows directly back into the reactor. Here, as indicated above, catalyst flow is controlled by the oxygen content of the regenerator flue gas and shot flow is controlled by regenerator temperature.

The separator may be designed for rather high gas velocity, as it may contain in its lower portion essentially pure shot and no catalyst. In this case the desired catalyst-to-shot ratio may be controlled as described above. However, the preferred velocity range is normally below that required to fluidize the shot when it is desired to withdraw a stream that is very high in shot content, as in Fig. 4.

In all the figures described above, the stripper or separator may be so designed that its gas velocity can be varied widely. With such variation the shot-to-catalyst ratio may be varied as widely as desired from pure shot to low shot content in the stream flowing through the "shot-rich" line.

With the system of Fig. 2, the flow rate of shot plus catalyst is controlled by the excess oxygen in the regenerator flue gas, whereas the shot-to-catalyst ratio is controlled by the quantity of gas brought into the separator. This in turn can be controlled directly by the regenerator temperature.

In the system of Fig. 4, the maximum shot-to-catalyst ratio which may be required is determined from process considerations. The reactor bottom and the separator are designed to correspond to the maximum shot-to-catalyst ratio. The minimum shot-to-catalyst ratio is next determined and storage for shot inventories are provided as required for that minimum. The shot reservoir or hopper is made large enough to hold a shot inventory equal to the difference between the maximum and minimum shot inventories.

With this arrangement control is as follows:

Increased shot-to-catalyst ratio is obtained by opening the valve 342, which is controlled by regenerator temperature. Level controller 330 also controls the gas valve 331. Shot is withdrawn from a lower section 350 of the separator, which is below the normal withdrawal line 340, through line 333. From here it passes into reservoir 336, then down line 343 to join line 340. The gas velocity in the separator 317 is preferably below 60% of the minimum fluidizing velocity required for the shot in this vessel. The total flow rate of shot and catalyst through valve 341 back to the regenerator is controlled by the oxygen content of the regenerator gases since valve 341 is under control of the excess oxygen meter.

It will be obvious that various instruments are suitable for use to effect the controls described above and that numerous modifications may be made without departing from the spirit of the invention.

What is claimed is:

In an endothermic reforming process having a reactor zone wherein a hydrocarbon feed is contacted with a fluid bed of finely divided solid catalyst and relatively coarse shot and a regeneration zone wherein carbonaceous deposits are burned from the catalyst and the shot is heated by contacting the catalyst undergoing regeneration, the improvement which comprises maintaining suitable thermal conditions in the regenerator zone by continuously supplying a constant amount of oxygen, continuously measuring the excess oxygen in the flue gas leaving the regeneration zone, controlling the amount of finely divided solid catalyst passed to the regenerator zone so as to utilize the excess oxygen, continuously measuring the temperature in the regeneration zone and controlling the amount of coarse shot passed to the regenerator so as to maintain the regenerator temperature at the required level.

References Cited in the file of this patent

UNITED STATES PATENTS

| | | |
|---|---|---|
| 2,391,327 | Mekler | Dec. 18, 1945 |
| 2,721,167 | Nicholson | Oct. 18, 1955 |
| 2,752,291 | Rex | June 26, 1956 |
| 2,763,595 | Fritz | Sept. 18, 1956 |